(12) United States Patent
Wu

(10) Patent No.: US 7,777,621 B2
(45) Date of Patent: Aug. 17, 2010

(54) AUTOMATIC ILLUMINATING APPARATUS AND METHOD FOR MOTOR VEHICLES

(75) Inventor: Chia-Ying Wu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/265,095

(22) Filed: Nov. 5, 2008

(65) Prior Publication Data

US 2009/0257238 A1 Oct. 15, 2009

(30) Foreign Application Priority Data

Apr. 9, 2008 (CN) .......................... 2008 1 0300929

(51) Int. Cl.
*B60Q 1/26* (2006.01)
(52) U.S. Cl. .................. 340/469; 307/10.8; 315/77; 315/82; 362/494
(58) Field of Classification Search ................ 340/431, 340/468, 469; 307/10.8; 362/487, 494; 315/77–82
See application file for complete search history.

(56) References Cited

U.S. PATENT DOCUMENTS

| | | | | |
|---|---|---|---|---|
| 5,030,884 A | * | 7/1991 | Roussey et al. | 315/83 |
| 5,666,028 A | * | 9/1997 | Bechtel et al. | 315/82 |
| 6,140,934 A | * | 10/2000 | Lam | 340/815.4 |
| 7,044,759 B2 | * | 5/2006 | Hughes | 439/180 |
| 2003/0231108 A1 | * | 12/2003 | Welch | 340/463 |
| 2005/0065684 A1 | * | 3/2005 | Larson et al. | 701/36 |
| 2007/0120494 A1 | * | 5/2007 | Lahr et al. | 315/82 |

* cited by examiner

*Primary Examiner*—Brent Swarthout
(74) *Attorney, Agent, or Firm*—Andrew C. Cheng

(57) ABSTRACT

The present invention relates to an automatic illuminating apparatus for motor vehicles. The apparatus includes an illumination device for emitting light beams, comprising a first light emitting member for emitting light beams in daytime and a controlling device electrically connected with the illumination device. The controlling device includes a sensor for sensing whether the vehicle is in motion, a time recording module for recording current time, a memory for storing an illumination period of the first light emitting member, a processor for analyzing whether the current time is in the illumination period which is electrically connected with the time recording module, the memory and the processor, and a controlling module for controlling the first light emitting member emitting light beams based on an analyzed result from the processor.

3 Claims, 3 Drawing Sheets

AUTOMATIC ILLUMINATING APPARATUS AND METHOD FOR MOTOR VEHICLES

BACKGROUND

1. Technical Field

The present invention generally relates to illuminating apparatus for motor vehicles, and, particularly, to an automatic illuminating apparatus for motor vehicles and a method for illuminating automatically using the same.

2. Discussion of Related Art

Inconsistent with people's cognition, research reports show that traffic accidents are more likely to occur in the daytime when motor vehicles are driven into a dark area, such as into a shadow of buildings. Experts believe that habit of not turning on head lights of the vehicles in the daytime causes many avoidable accidents. Research reports further show that driving with the head lights turned on can decrease about 35% crash accidents and about 25% traffic fatal accidents. Therefore, it is very important to turn on the head lights when driving in the daytime.

However, nowadays, head lights are generally controlled manually. In addition, drivers typically do not have the habit of turning on the head lights when driving in the daytime. Furthermore, the head lights are designed to emit bright light beams which consume a great amount of energy.

What is desired, therefore, is an automatic illuminating apparatus for motor vehicles and a method for illuminating automatically to overcome the above-described problems.

SUMMARY

An automatic illuminating apparatus for motor vehicles includes an illumination device and a controlling device electrically connected with the illumination device. The illumination device includes a first light emitting member for emitting light beams in daytime. The controlling device includes a sensor for sensing whether the vehicle is in motion, a time recording module for recording current time, a memory for storing an illumination period of the first light emitting member, a processor for analyzing whether the current time in the illumination period which is electrically connected with the sensor, the time recording module and the memory, and a controlling module for controlling the first light emitting member emitting light beams based on an analyzed result from the processor.

Other advantages and novel features of the present automatic illuminating apparatus and method for illuminating automatically will become more apparent from the following detailed description of embodiment when taken in conjunction with the accompanying drawings.

BRIEF DESCRIPTION OF THE DRAWINGS

Many aspects of the embodiments can be better understood with reference to the accompanying drawings. The components in the drawings are not necessarily drawn to scale, the emphasis instead being placed upon clearly illustrating the principles of embodiments. Moreover, in the drawings, like reference numerals designate corresponding parts throughout different views.

DETAILED DESCRIPTION OF EMBODIMENTS

Embodiments of the present automatic illuminating apparatus for motor vehicles will now be described in detail below and with reference to the drawings.

Figure 1:
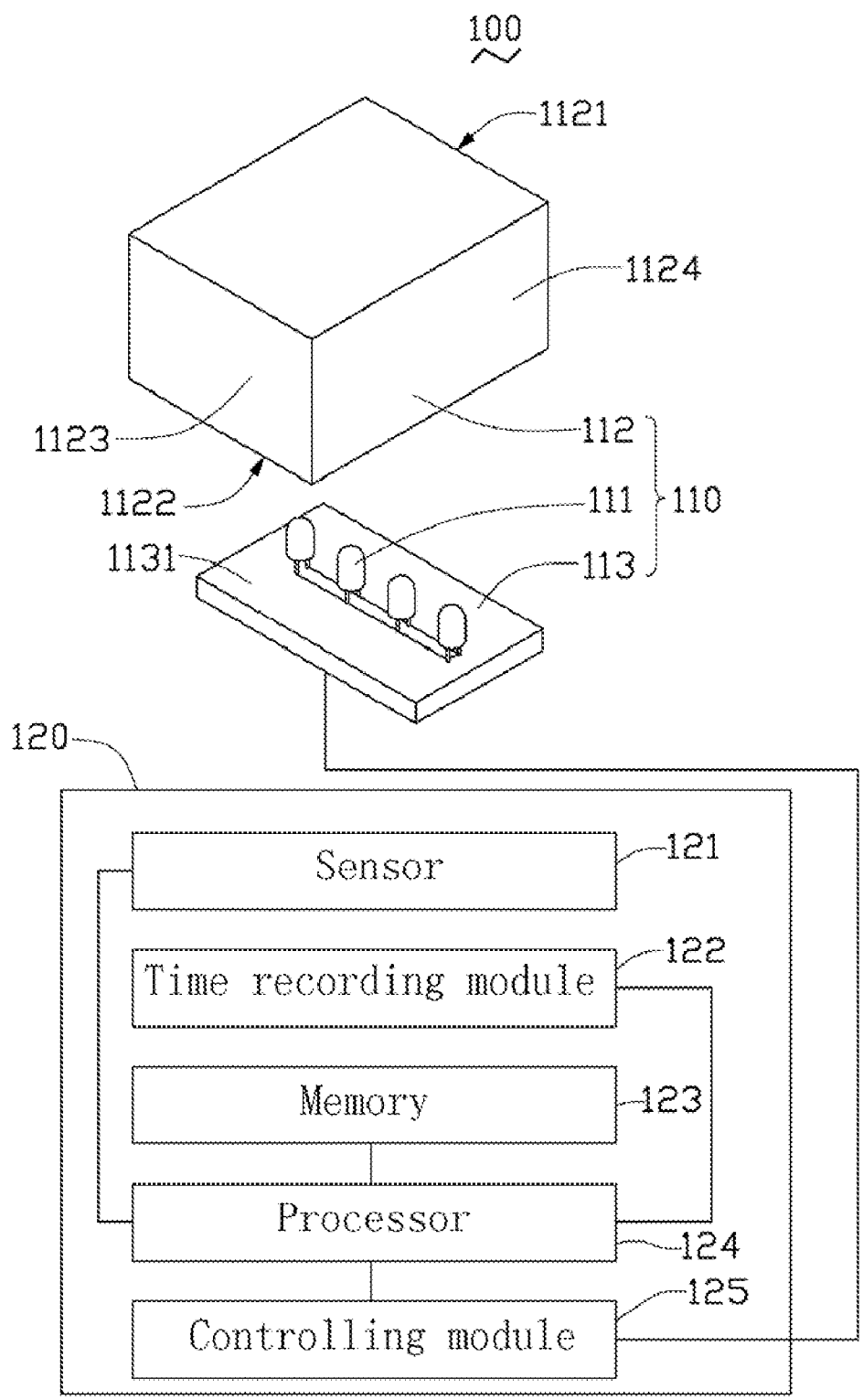
FIG. 1 is a schematic view of an automatic illuminating apparatus in accordance with a first exemplary embodiment.

Referring to FIG. 1, an automatic illuminating apparatus 100 provided in a first embodiment includes an illumination device 110 and a controlling device 120 electrically coupled to the illumination device 110.

The illumination device 110 includes an first light emitting member 111, a light guide member 112 and a substrate 113. The illumination device 110 can be accommodated in a cavity (not shown) in a vehicle to function as a vehicle light.

The first light emitting member 111 is configured for emitting light in the daytime, and is positioned on a surface 1131 of the substrate 113. Light emitting diodes (LEDs) are widely used due to their attractive properties such as high luminance, small volume, low pollution and low power-consumption. Therefore, preferably, the first light emitting member 111 is comprised of a plurality of LEDs to reduce energy-consumption.

The light guide 112 is arranged adjacent to the first light emitting member 111. The light guide member 112 can be a lampshade or a light guiding plate. When the light guide member 112 is a lampshade, the lampshade cooperates with the aforementioned cavity and the substrate 113 to form a receiving space for accommodating the first light emitting member 111, thereby protecting the first light emitting member 111 from being damaged. In the present embodiment, the light guide member 112 is a light guide plate including a bottom surface 1121, a light incident surface 1122, a light emitting surface 1123 and a number of side surfaces 1124. The light incident surface 1122 is adjacent to the first light emitting member 111, and is configured for receiving the light emitted from the first light emitting member 111. The bottom surface 1121 adjoins to the light incident surface 1122. The light emitting surface 1123 is opposite to the bottom surface 1121. The light incident surface 1122 is connected to the light emitting surface 1123. The light guide 112 converts the light into uniform plane light beams and transmits the light beams to the light emitting surface 1123, as such, the light emitted form the light emitting surface 1123 has a uniform brightness.

In addition, a plurality of dots (not shown) can be formed on an inner portion of the bottom surface 1121 to improve an uniformity of the light emitted from the light emitting surface 1123. A reflecting member (not shown) such as a reflecting film or a reflecting plate can be attached onto the bottom surface 1121 and the side surfaces 1124. The reflecting member is configured for reflecting the light beams transmitting through the bottom surface 1121 and the side surfaces 1124 to inside of light guide member 112. In this way, light loss is reduced.

The controlling device 120 includes a sensor 121, a time recording module 122, a memory 123, a processor 124 and a controlling module 125.

The sensor 121 is an accelerator sensor for sensing whether the vehicle is in motion and transmitting the sensing result to the processor 122.

The time recording module 122, electrically coupled to the processor 124, is used for recording current time, the processor 124 can read current time from the time recording module 122.

The memory 123 is in electrical connection with the processor 124, and configured for storing an illumination period of the first light emitting member 111 and transmitting the illumination period to the processor 124.

The processor 124 is electrically connected to the time recording module 122, the sensor 121 and the memory 123 and is used for analyzing whether the current time is in the illumination period based on the sensing result and transmitting an analyzed result to the controlling module 125.

The controlling module 125 is in electrical connection to the processor 124 and the first light emitting member 111, and configured for controlling the first light emitting member 111 according to the analyzed result.

In this present embodiment, the first light emitting member 111 emits light beams according to a control signal of the controlling device 120. In this way, the illuminating apparatus 100 illuminates without manual operation.

Figure 2:
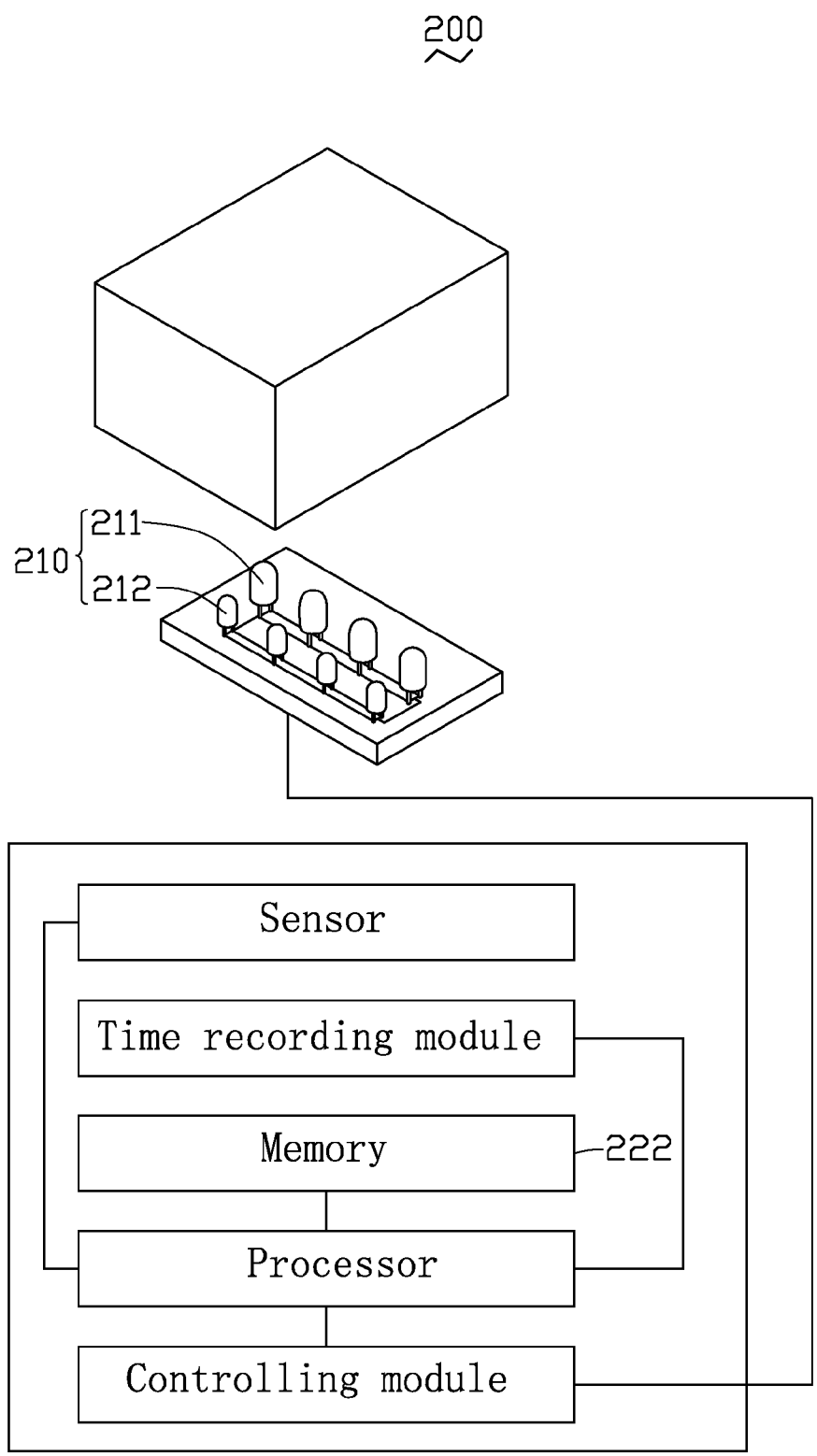
FIG. 2 is a schematic view of an automatic illuminating apparatus in accordance with a second exemplary embodiment.

Referring to FIG. 2, an automatic illuminating apparatus 200 is provided according to a second exemplary embodiment. The apparatus 200 is similar to the illuminating apparatus 100, but the illumination device 210 further includes a second light emitting member 212 for illuminating light in night.

The second light emitting member 212 is in a parallel electrical connection to the first light emitting member 211. An illumination period of the second light emitting member 212 is also stored in the memory 123. The second light emitting member 212 can be selected from the consisting group of incandescence lamps, fluorescent lamps and halogen lamps. In this way, if a vehicle is driven during the illumination period for the second light emitting member 212, the second light emitting member 212 emits light beams in night automatically.

A method for illuminating automatically will be described below with an example of automatic illumination in daytime using the illuminating apparatus 100.

Figure 3:
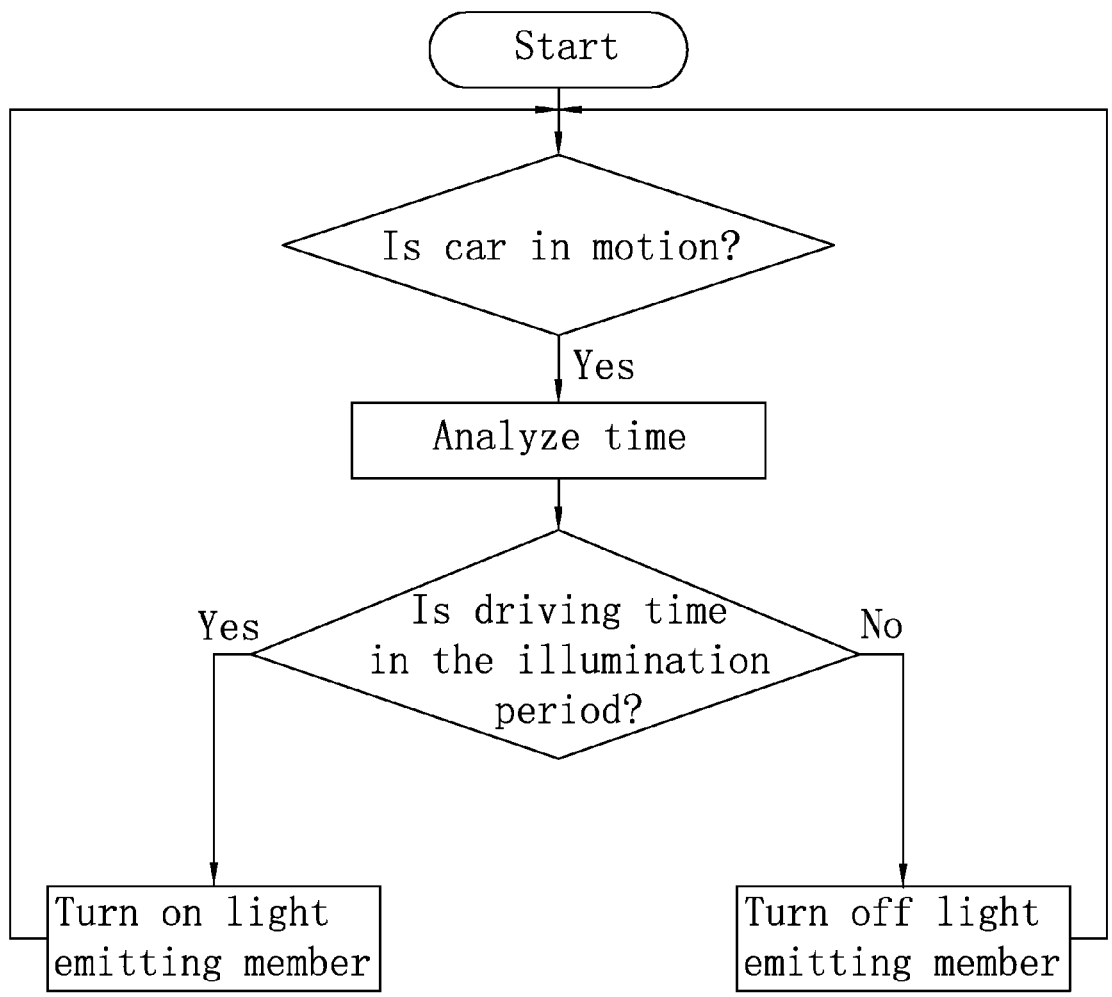
FIG. 3 is a flowchart of a method for illuminating automatically using the illuminating apparatus shown in FIG. 1.

Referring to FIG. 3 and FIG. 1, an illumination period of the first light emitting member 111 is stored in the memory 123. Whether the vehicle is in motion is sensed using the sensor 121. Take daytime illumination for example, the value range of the illumination period can be from 6 am to 5 pm in the seasons of spring and winter. A current time is recorded using the time recording module chip 122. It is to be understood that the illumination period can also vary everyday according to practical sunrise time and sunset time. In addition, the sunrise time and sunset time in different time zones are also different. Therefore, the controlling device 120 can further include a global positioning system (GPS) module for detecting a longitude of the vehicle. As such, the processor 124 can calculate the start time and end time of the daytime according to the longitude.

When the sensor 121 senses that the vehicle is in motion, the processor immediately start to analyze whether the current time is in the illumination period, an analyzed result is transmitted to the controlling module 125.

If the current time is in the illumination period, the controlling module 125 controls the first light emitting member 111 to emit light.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for illuminating automatically for a motor vehicle via an automatic illuminating apparatus which comprises a memory, a sensor, a time recording module, a processor and a controlling module,
the method comprising:
   calculating the start time and end time of an illumination period according to the longitude of the motor vehicle;
   storing the illumination period of a first light emitting member for emitting light beams in daytime in the memory;
   judging whether the vehicle is in motion using the sensor;
   if the vehicle is in motion, then reading the current time from the time recording module to the processor;
   analyzing whether the current time is within the illumination period; and
   if current time is within the illumination period, then controlling the first light emitting member to emit light beams, else turning off the first light emitting member, using the controlling module.

2. The method as claimed in claim 1, further comprising:
   providing a second light emitting member electrically connected in parallel with the first light emitting member for the automatic illuminating apparatus;
   storing an illumination period of a second light emitting member for emitting light beams in night in the memory;
   analyzing whether the current time is in the illumination period of the second light emitting member using the processor; and
   controlling the second light emitting member to emit light beams using the controlling module based on an analyzed result from the data processing.

3. An automatic illuminating apparatus for a motor vehicle, comprising:
   an illumination device for emitting light beams, comprising a first light emitting member for emitting light beams in daytime; and
   a controlling device electrically coupled to the illumination device, the controlling device comprising:
   a sensor capable of sensing whether the motor vehicle is in motion;
   a time recording module capable of providing a time information;
   a memory for storing an illumination period of the first light emitting member;
   a controlling module capable of controlling the first light emitting member;
   a global positioning system module for detecting a longitude of the motor vehicle; and
   a processor electrically coupled to the sensor, the time recording module, the memory, and the controlling module, the processor being configured for analyzing whether the current time is in the illumination period when the vehicle is in motion and transmitting an analyzed result to the controlling module such that the first light emitting member is turn on or turn off automatically, and calculating the start time and end time of the illumination period according to the longitude.

* * * * *